(12) United States Patent
Dix

(10) Patent No.: US 7,580,783 B2
(45) Date of Patent: Aug. 25, 2009

(54) CORRECTION IN POSITION WITH HITCH POSITION SENSOR

(75) Inventor: Peter J. Dix, Naperville, IL (US)

(73) Assignee: CNH America LLC, New Holland, PA (US)

( * ) Notice: Subject to any disclaimer, the term of this patent is extended or adjusted under 35 U.S.C. 154(b) by 180 days.

(21) Appl. No.: 11/025,395

(22) Filed: Dec. 29, 2004

(65) Prior Publication Data

US 2006/0142936 A1 Jun. 29, 2006

(51) Int. Cl.
*G06F 7/70* (2006.01)
(52) U.S. Cl. .................. 701/50; 701/213; 342/357.17
(58) Field of Classification Search .................. 701/50, 701/213, 214; 342/357.17; 172/3
See application file for complete search history.

(56) References Cited

U.S. PATENT DOCUMENTS

| | | | |
|---|---|---|---|
| 5,549,166 A | 8/1996 | Orbach et al. | |
| 5,802,489 A | 9/1998 | Orbach et al. | |
| 6,434,462 B1 * | 8/2002 | Bevly et al. | 701/50 |
| 6,708,080 B2 | 3/2004 | Benneweis | |
| 6,804,587 B1 | 10/2004 | O Connor et al. | |
| 6,804,597 B1 | 10/2004 | Posselius et al. | |
| 7,054,731 B1 * | 5/2006 | Lange et al. | 701/50 |
| 7,162,348 B2 * | 1/2007 | McClure et al. | 701/50 |
| 7,225,891 B2 * | 6/2007 | Gehring et al. | 180/14.2 |
| 2002/0095251 A1 | 7/2002 | Oh et al. | |
| 2002/0107627 A1 | 8/2002 | Funke et al. | |
| 2003/0187560 A1 | 10/2003 | Keller et al. | |
| 2003/0208311 A1 | 11/2003 | McClure | |
| 2004/0186644 A1 | 9/2004 | McClure et al. | |
| 2005/0015189 A1 * | 1/2005 | Posselius et al. | 701/50 |
| 2005/0288834 A1 * | 12/2005 | Heiniger et al. | 701/23 |

* cited by examiner

*Primary Examiner*—Mark Hellner
(74) *Attorney, Agent, or Firm*—Patrick M. Sheldrake; John William Stader; Michael G. Harms

(57) ABSTRACT

An automatic guidance system for an agricultural vehicle includes a tractor, a towed implement, an absolute tractor position sensor, a relative implement position sensor, and an electronic control system. The operator inputs the implement geometry and field information into the control system. The control system combines this data with the absolute vehicle position and relative implement position to accurately guide the towed implement through a field.

8 Claims, 3 Drawing Sheets

CORRECTION IN POSITION WITH HITCH POSITION SENSOR

FIELD OF THE INVENTION

The invention relates generally to agricultural vehicles, and more particularly to tractors or work vehicles that tow implements. The invention calculates a towed implement position based on a towing vehicle position and uses a device indicating relative position of the towed implement.

BACKGROUND OF THE INVENTION

Tractors and other off-road work vehicles in the agricultural, mining and construction industries have typically operated with manual steering by the operator. Recent changes in control systems and the development of satellite navigation systems (e.g global positioning systems or GPS) have allowed tractors to operate in a semi-automatic or fully automatic steering mode. Combining satellite navigation and ground-based navigation input signals regarding vehicle position and speed with a sophisticated on-board vehicle electronic control system allow the tractor to steer itself with a high degree of accuracy when traversing terrain.

To provide this control, the prior art teaches using satellite navigation system information by an on-board vehicle electronic control system to accurately determine and control a vehicle's position while operating in the field. The operator will typically enter the planned route of the tractor, or let the control system determine the most efficient route. The control methods are well known in the art, and may involve multiple position transmitters or receivers, with various signals signifying location and speed. However these methods do not control a towed implement accurately, as the towed implement does not follow the same path as the towing vehicle.

Tractors do not generally to agricultural work directly. Instead, they tow implements that have several ground engaging tools. If the tractor guides itself with a high degree of accuracy, and the implement is rigidly attached to tractor, the implements can follow the ground and their tools can engage the ground with a high degree of accuracy (assuming the tractor is guided with a high degree of accuracy). Not all implements are rigidly attached to the tractor, however. Many are pivotally attached to tractor, like a trailer towed behind an automobile. Because of this pivotal coupling with respect to the tractor, controlling the tractor's position with a high degree of accuracy does not guarantee that the implement position is going to be similarly controlled.

To solve this problem, the prior art teaches the addition of one or more GPS receivers on the towed implement. This method gives a more accurate location for the towed implement, but requires a GPS for each implement. Typically agricultural operations will require several different towed implements to affect the field during the growing cycle of a crop. This would require several GPS receivers, or the removal and reattachment of GPS receivers to each successive implement, in order to allow each towed implement to be tracked accurately according to a planned implement path in the field.

Another proposed solution has been to provide the towed implement with a discrete control system that lets the implement determine its position and steer itself with respect to the tractor. The drawback of the system is the addition of a discrete control system as well as steering actuators and position sensors for every implement.

What is needed is a more accurate and inexpensive method of determining and controlling the path of a towed implement, using the steering actuator of the tractor itself. What is also needed is a relative position sensor that can be used with a variety of implements, and does not need to be removed and reinstalled, or duplicated for each towed implement. What is further needed is a guidance system that allows the operator to input the geometry of a towed implement, and then uses the vehicle position and towed implement geometry and relative position to accurately control the implement path by actuating the tractor steering mechanism.

SUMMARY OF THE INVENTION

In accordance with a first aspect of the invention, a computer-implemented method for steering an agricultural vehicle towing an implement is provided, comprising the steps of receiving satellite navigation data indicating a vehicle location and direction of movement, receiving data indicative of a position of the implement relative to the vehicle, calculating a steering command based at least upon the satellite data and the data indicative, and steering the vehicle with the steering command.

The data indicative may include data indicative of an angle between the vehicle and the implement. The step of receiving data indicative may include the step of measuring the angle between the vehicle and the implement, wherein the angle is horizontal and taken at a coupling between the vehicle and the implement. The steering method may include the step of receiving a yaw rate signal, and the step of calculating a steering command may include the step of calculating the steering command based upon the yaw rate signal. The step of calculating a steering command may include calculating a steering command configured for forward travel and a steering command configured for reverse travel. The step of calculating a steering command may include calculating an estimated vehicle heading based upon a yaw rate signal and the vehicle location. The step of calculating a steering command may include calculating an estimated implement position and an estimated implement heading based upon the estimated vehicle heading and the data indicative. The step of calculating a steering command may include calculating a desired vehicle steering angle based on the estimated implement position and the estimated implement heading and the data indicative. The steering command may be a valve command, and the step of calculating a steering command may include a step of calculating a steering valve command based upon the desired vehicle steering angle and the actual vehicle steering angle.

In accordance with a second aspect of the invention, a guidance system for a tractor towing an implement is provided, the system comprising means for generating tractor location and direction of movement signals, means for generating an angle signal representing an angle between the tractor and the towed implement, and means for computing an implement heading based upon the tractor location and movement signals, and the angle signal.

The tractor location means may include a means for receiving satellite navigation information. The guidance system may include a means for computing a tractor heading based upon the implement heading and the angle signal.

In accordance with a third aspect of the invention, an agricultural vehicle is provided, including a tractor, a towed implement, coupled to the tractor, a position sensor configured to indicate the position of the tractor, a relative position sensor configured to provide a signal indicating a relative position of the implement with respect to the tractor, and an electronic control system for calculating a heading of the tractor based on the position of the tractor and the relative position of the implement.

The electronic control system may include at least one digital microprocessor and digital memory. The electronic control system may be configured to calculate a steering command for the tractor. The implement may be pivotally coupled to the tractor at an implement hitch, and the relative position sensor may measure an angle between the towed implement and the tractor at the hitch. The electronic control system may include an operator input device, wherein the operator input device is configured to receive a geometry of the towed implement and the digital memory is configured to store the geometry. The electronic control system may be configured to calculate a desired vehicle steering angle based at least upon the geometry and the relative position signal. The electronic control system may be configured to calculate a steering command for the tractor based at least upon the position of the tractor and the relative position signal. The position sensor may include a satellite navigation receiver.

DETAILED DESCRIPTION OF THE PREFERRED EMBODIMENTS

"Towed" or "towing" refers to an agricultural work vehicle (e.g. a tractor) pulling or pushing an implement (e.g. a plow). Typically, the implement will be towed behind the vehicle, however for some applications, the implement will be pushed ahead of the vehicle. Therefore towing may refer both to implement-in-front or implement-behind configurations.

Figure 1:
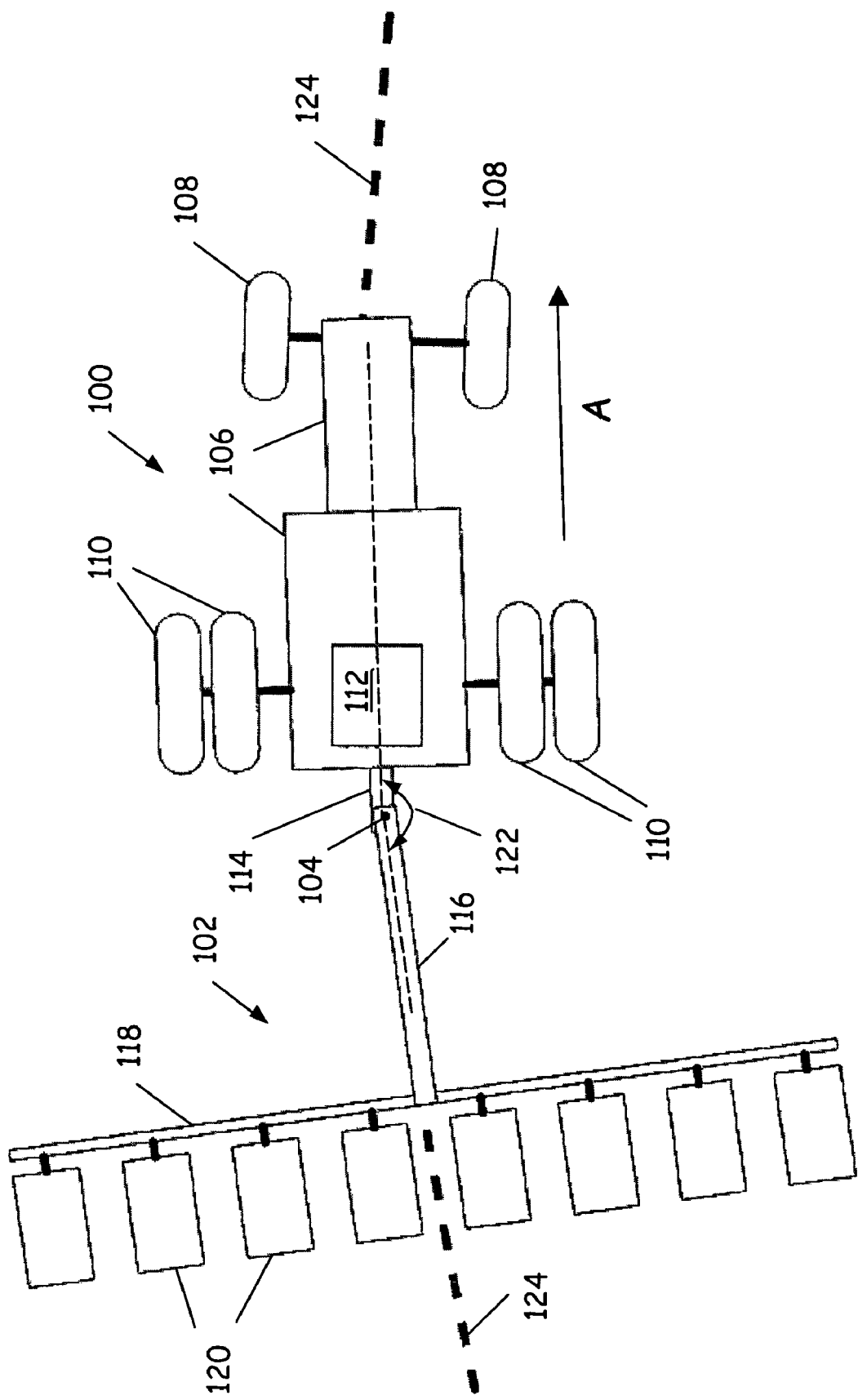
FIG. 1 is a top view of a work vehicle and towed implement, showing planned implement path and implement angle in accordance with the present invention.

FIG. 1 shows a tractor 100 pivotally coupled to a towed implement 102 via a hitch pin 104. The tractor 100 includes a chassis 106, steerable wheels 108, rear drive wheels 110, a GPS (global positioning system) receiver 112, and a hitch 114. The steerable wheels 108 are located near the front of the tractor and are pivotally and rotatably attached to the chassis 106. The drive wheels 110 located near the rear of the tractor are rotatably attached to the chassis 106. The hitch 114 is rigidly attached to the rear of the chassis 106. The GPS receiver 112 is mounted on the tractor such that reception of satellite signals is maximized. The steerable wheels may be steerable with respect to the frame to which they are mounted, or alternatively they may be mounted on a frame that is itself steerable with respect to another portion of the vehicle, such as wheels that are steered by articulating the frame or chassis of a vehicle. Some vehicles are configured to both steer wheels with respect to a frame to which they are coupled (traditional steering) and also to steer that frame with respect to another frame of the vehicle (articulated steering). Wheels that are steerable by more than one method of steering, such as this traditional steering plus articulated steering, are also considered steerable wheels.

The towed implement 102 includes a tongue 116, a tool bar 118 and a plurality of ground engagement tools 120 distributed along the length of the tool bar. The forward end of the tongue 116 is pivotally coupled to the hitch 114 of the tractor 100. The tongue typically extends backward away from the tractor, along a longitudinal centerline of the tractor. The tool bar 118 is rigidly attached to the tongue 116, preferably perpendicularly, and extends laterally away from the tongue. The ground engagement tools 120 depend from or are supported by the tool bar 118. The tools engage the ground directly by contacting the ground, as in the case of a plow having multiple plowshares. Alternatively, the tools may engage the ground indirectly, as in the case of sprayer implement with multiple sprayer heads.

At the beginning of a workcycle, the tractor is typically parked and not coupled to the implement. The farmer backs the tractor 100 up to the implement 102, aligning the hitch 114 with the tongue 116 such that the hitch pin 104 can be inserted in receiving apertures in the tongue and hitch. After inserting the hitch pin, thereby coupling the implement to the tractor, the farmer drives the tractor to the field to be cultivated, towing the implement behind the tractor.

FIG. 1 shows the tractor moving forward, seen in direction of travel arrow "A", and pulling the towed implement behind the tractor. Some tractors may be operated in reverse, in which case the direction of travel would be opposite the direction of travel "A", and the tractor would push the implement through the field. Alternatively, the hitch 114 may be mounted on the front of the tractor, allowing the farmer to push the implement through the field while operating in direction of travel "A". Whether and implement is pushed are pulled, it is considered to be "towed" for purposes of this application.

The farmer typically processes the field in long swaths, turning at the end of a swath and returning back to the starting end of the field. If the farmer processes the field topographically (contour plowing), he will follow a curved path for each swath.

When the tractor drives in a straight line, the towed implement centerline will tend to follow the tractor centerline. In this case, the relative position of the implement 102 is directly behind the tractor 100; or, in other words, a hitch angle 122 measured on a vertical axis at the hitch pin 104 describing the angle between the hitch 114 and the tongue 116 will be 180 degrees. However, when the tractor drives in a curved path, or when the implement encounters an obstruction such as a boulder in the field, the towed implement centerline will not follow the tractor centerline. In this case, the hitch angle 122 is more or less than 180 degrees, signifying that the implement is not directly behind the tractor. The hitch angle 122 serves as an indicator of the relative position and orientation of the implement with respect to the tractor at all times.

Alternatively, hitch 114 may allow the implement to rotate in horizontal, vertical and longitudinal axes simultaneously. In this case, the hitch angle 122 would have three components: horizontal, vertical and longitudinal. In the preferred embodiment, shown here, the relative position sensor (e.g. the hitch angle sensor 203) senses the angle of the hitch with respect to the tractor about a vertical axis. In alternative configurations, and for more precision, a relative position sensor can include hitch angle sensors that sense the implement's rotation about the other two axes with respect to the vehicle.

As they move through the field, the tractor and the implement will describe distinct paths through the field. While the farmer directly controls the direction and movement of the tractor, he is more concerned with implement path 124 than with the path of the tractor, since the implement performs the work on the crops.

While driving the tractor, the farmer will frequently look back at the towed implement and correct the heading of the tractor to keep the tools on the towed implement aligned with the crop rows. The farmer changes the tractor's heading by pivoting the front steerable wheels 108 until the tools 120 are in proper alignment with the crop rows.

Figure 2:
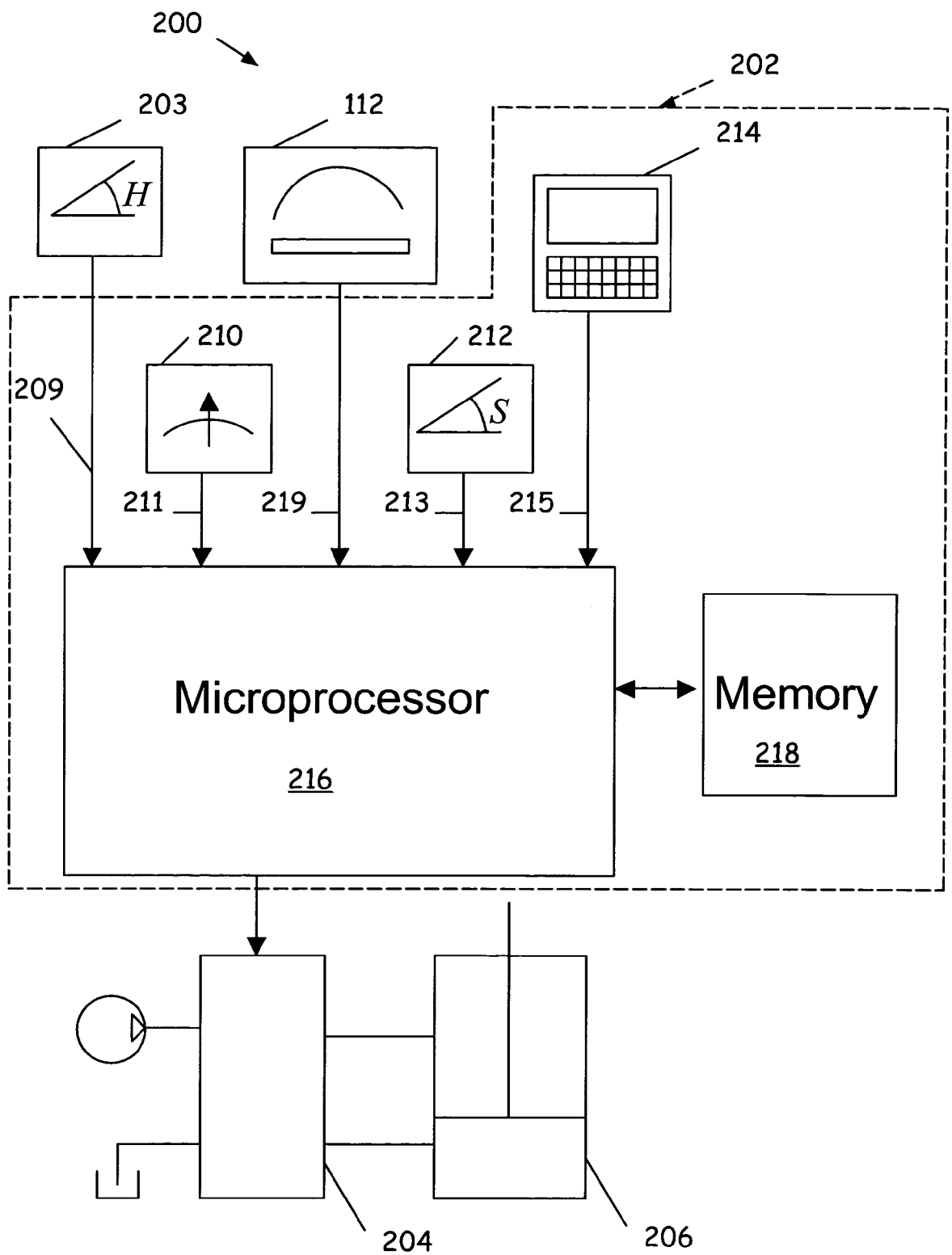
FIG. 2 is a schematic of the guidance system.

An automatic guidance system 200, seen schematically in FIG. 2, is located on or in the tractor 100 and simplifies the task of driving the tractor. The guidance system 200 includes an electronic control system 202, GPS receiver 112, hitch angle sensor 203, steering valves 204 and a steering actuator 206. The electronic control system 202 is communicatively connected to the valves 204, the GPS receiver 112 and the hitch angle sensor 203. The valves are preferably proportional or directional control valves and are hydraulically connected to the steering actuator 206. The steering actuator is coupled to and steers the steerable wheels (FIG. 1), changing their steering angle. The electronic control system continually calculates a vehicle steering heading, and sends it to the valves, which in turn move the steering actuator, thereby causing the steerable wheels to pivot, changing the vehicle heading.

The electronic control system 202 is located on or in the tractor 100, and includes a vehicle yaw rate sensor 210, a vehicle steering angle sensor 212, an operator input device 214, one or more microprocessors 216, and digital memory circuit 218. The yaw rate sensor 210, steering angle sensor 212, operator input device 214 and digital memory 218 are communicatively coupled to the microprocessor 216. The microprocessor is communicatively coupled to the valves 204.

The relative position sensor, here shown as hitch angle sensor 203, sends a signal indicative of the relative position of the implement (in this case a continuous hitch angle signal 209) to the microprocessor 216. The hitch angle signal tells the microprocessor the position and alignment of the implement with respect to the tractor. The hitch angle sensor 203 is preferably an optical encoder mounted on the tractor hitch 114 coaxially with the hitch pin 104. An alternative hitch angle sensor is a potentiometer or variable resistor. Alternatively, the hitch angle sensor may be any device that measures relative implement position without necessarily measuring the hitch angle. The hitch angle sensor 203 need not be the located right at the hitch. It may be disposed a short distance away and be coupled to the hitch by a mechanical linkage.

The vehicle yaw rate sensor 210 provides a continual yaw rate signal 211 to the microprocessor 216, telling the microprocessor the rate at which the vehicle is changing its heading. The yaw rate sensor may be a laser gyro or other rate gyro. Alternatively, the vehicle yaw rate sensor may be a microprocessor circuit programmed to calculate the yaw rate from incoming signals or estimated or calculated values.

The vehicle steering angle sensor 212 sends a continual steering angle signal 213 to the microprocessor 216. The steering angle signal tells the microprocessor the current angle of the steerable wheels. The steering angle sensor may be an encoder mounted on the tractor 100, or may be a microprocessor circuit programmed to calculate steering angle based upon incoming signals and values stored in digital memory 218. Alternatively, it may include a Hall effect device, potentiometer, variable resistor, linear position transducer, or any other sensor in or on the steering actuator, the wheel, the wheel hub, or steering joint that senses wheel steering or relative movement or position of the wheel with respect to another part of the vehicle, such as wheel rotation about a steering kingpin, or alternatively senses the displacement or movement of the steering actuator or other linkage coupled thereto. If the vehicle is an articulated vehicle, the steering angle sensor can also be disposed to detect the angle between the two or more vehicle frames are subframes that move or steer with respect to each other in order to turn the vehicle.

The operator input device 214 is configured to receive information about the field to be processed from the operator, and to transmit the information to the microprocessor 216. This information may include data such as the size of the field, the operations to be performed, the implements to be used to engage the ground while processing the field, and the geometry 215 of each implement 102. The geometry 215 describes the ground engagement points of the tools 120 with respect to the location of the hitch pin 104 when the implement 102 is coupled to the tractor 100.

The operator input device 214 is preferably mounted inside the operator compartment of the tractor 100, to be easily accessible to the operator. The input device preferably includes a display and a keyboard. The microprocessor 216 receives process variables from the keyboard, and displays the current status of the vehicle (location, direction, etc.) on the display.

Data entered by the operator on the input device 214 are stored in digital memory 218 by the microprocessor 216.

Memory 218 stores microprocessor instructions and data. The instructions configure the microprocessor to perform the guidance functions indicated in FIG. 3. The memory also stores process data calculated or estimated by the microprocessor and entered by the operator using the operator input device 214.

The GPS receiver 112 continually receives information about the absolute position of the vehicle and forwards a vehicle position signal 219 to the microprocessor 216 that indicates this absolute position. The GPS receiver 112 is a satellite navigation system typically mounted on the outside of the tractor 100, with a clear line of sight to the satellites. Alternatively, the GPS receiver may include an antenna mounted outside the tractor, while the receiver is mounted inside the tractor. Alternatives to a GPS receiver are differential global positioning systems (DGPS), land-based position receivers or dual frequency real time kinematics (RTK) receivers using inertial navigation system (INS) sensors.

Figure 3:
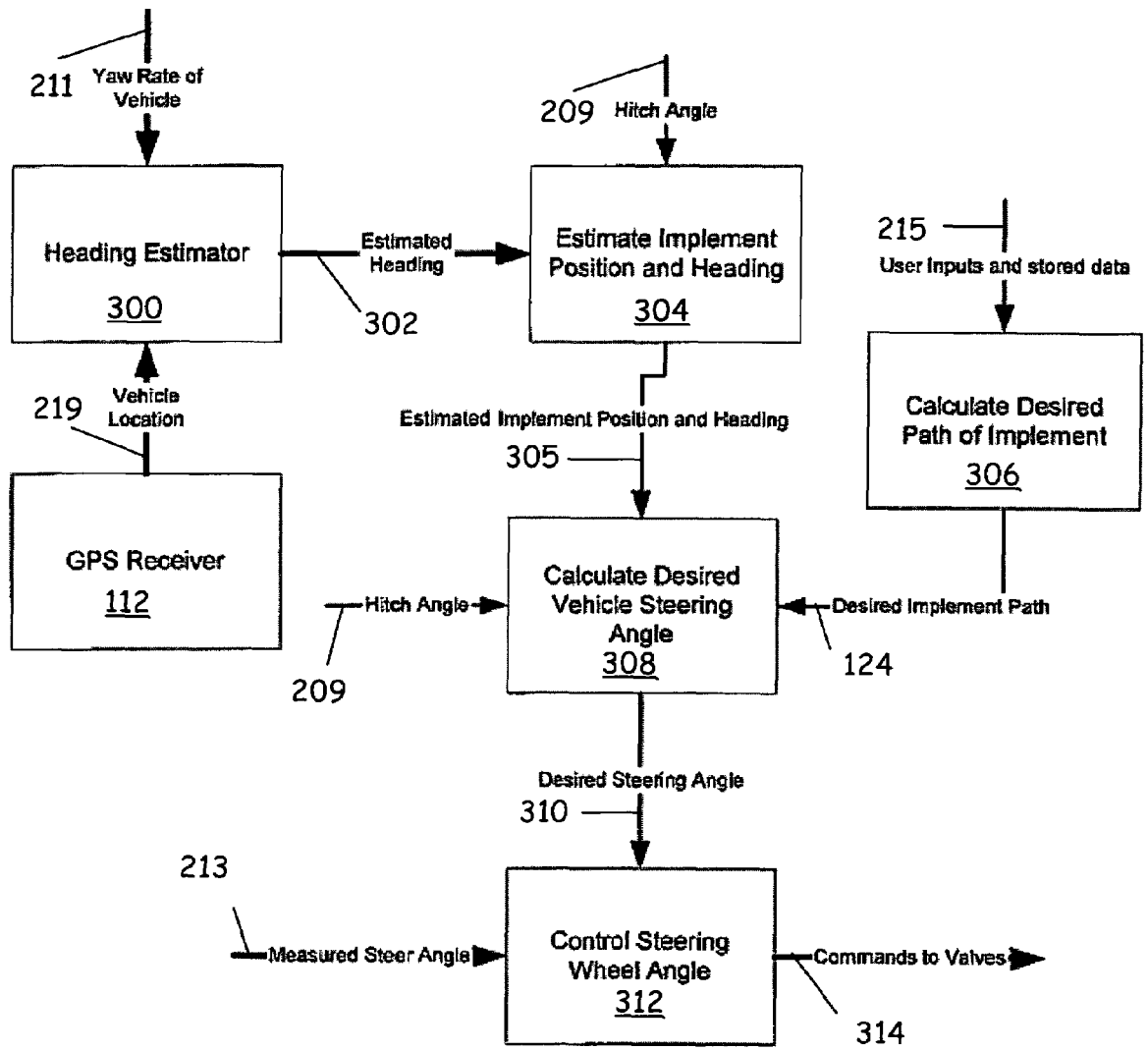
FIG. 3 is a process diagram of the guidance system.

FIG. 3 shows the process of calculating the vehicle heading and corresponding steering command. The GPS receiver 112 transmits the vehicle position signal 219 to the microprocessor 216, and the yaw rate sensor 210 transmits the vehicle yaw rate signal 211 (rate of change of vehicle heading or direction of travel) to the microprocessor. The microprocessor is programmed with a heading estimator algorithm 300 that uses these signals and calculates an estimated heading 302 for the vehicle based thereon.

The hitch angle sensor 203 transmits the hitch angle signal 209 to the microprocessor 216. The microprocessor is programmed with an implement position and heading estimator algorithm 304 that uses the hitch angle signal and estimated vehicle heading 302, and calculates an estimated position and heading 305 for the implement based thereon.

The farmer enters the geometry 215 on the operator input device 214, along with other information regarding the field to be processed. The operator input device transmits this data to the microprocessor 216. The microprocessor is programmed with an implement path calculation algorithm 306 that uses the geometry and field information and calculates a desired implement path 124 to be followed by the implement 102 based thereon.

The microprocessor is programmed with a steering angle calculation algorithm 308 that uses the hitch angle signal 209, estimated implement position and heading 305 and desired implement path 124 and calculates a desired vehicle steering angle 310 based thereon.

The vehicle steering angle sensor 212 transmits the measured vehicle steering angle signal 213 to the microprocessor 216. The microprocessor is programmed with a steering wheel angle control algorithm 312 that uses the desired vehicle steering angle 310 and the measured vehicle steering angle signal 213 and calculates the steering commands 314 that the microprocessor sends to the valves 204 based thereon.

There are alternative approaches to the preferred embodiments. The implement angle may be about the horizontal or longitudinal axes, or a combination of the horizontal, longitudinal and vertical axes, in order to determine the relative position in three dimensions of the towed implement. The yaw rate signal may be obtained by a combination of other signals such as the vehicle speed and steering angle.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

I claim:

1. A computer-implemented method for steering an agricultural vehicle towing an implement comprising the steps of:
   receiving satellite navigation data indicating a vehicle location and direction of movement;
   receiving data indicative of an angle between the implement and the vehicle from a sensor means solely carried on the vehicle;
   calculating a steering command for the path of travel of the agricultural vehicle based at least upon the satellite data and the data indicative such that the implement travels over a predefined path; and
   steering the vehicle with the steering command; wherein the steering command is calculated solely from means carried on the vehicle.

2. The method of claim 1, wherein the step of receiving data indicative further includes the step of measuring the angle between the vehicle and the implement, wherein the angle is horizontal and taken at a coupling between the vehicle and the implement.

3. The method of claim 1, further comprising the step of receiving a yaw rate signal, and further wherein the step of calculating a steering command includes the step of calculating the steering command based upon the yaw rate signal.

4. The method of claim 1, wherein the step of calculating a steering command includes calculating a steering command configured for forward travel and a steering command configured for reverse travel.

5. The method of claim 1, wherein the step of calculating a steering command includes calculating an estimated vehicle heading based upon a yaw rate signal and the vehicle location.

6. The method of claim 5, wherein the step of calculating a steering command includes calculating an estimated implement position and an estimated implement heading based upon the estimated vehicle heading and the data indicative.

7. The method of claim 6, wherein the step of calculating a steering command includes calculating a desired vehicle steering angle based on the estimated implement position and the estimated implement heading and the data indicative.

8. The method of claim 7, wherein the steering command is a valve command, and further wherein the step of calculating a steering command includes a step of calculating a steering valve command based upon the desired vehicle steering angle and the actual vehicle steering angle, wherein valves controlled by the command are hydraulically connected to the steering actuator that steers wheels or tracks of the vehicle.

\* \* \* \* \*